July 25, 1944.   R. J. MILLER   2,354,396
TURBO TRANSMISSION
Filed April 28, 1941   2 Sheets-Sheet 2

INVENTOR.
RAYMOND J. MILLER
BY
ATTORNEY

Patented July 25, 1944

2,354,396

UNITED STATES PATENT OFFICE 2,354,396

TURBOTRANSMISSION

Raymond J. Miller, Detroit, Mich., assignor to Hydraulic Brake Company, Detroit, Mich., a corporation of California Application April 28, 1941, Serial No. 390,812

3 Claims. (Cl. 60—54)

This invention relates to turbotransmissions, and particularly to turbotransmissions for motor vehicles.

In fluid transmissions of all types, there is a differential in the speed of the impeller and the speed of the turbine. This differential is generally termed "slip." It is not constant, but varies under different conditions. The maximum slip occurs when the vehicle is standing still with its motor operating at stalling speed, and the minimum slip occurs when the vehicle is proceeding at full speed. For illustration, the motor of a vehicle idles at about 600 R. P. M.; hence the impeller is driven at that speed and the associated turbine connected through the driven shaft to the differential gearing of the rear axle of the vehicle is at zero R. P. M. Thus, there is a difference of 600 R. P. M. between the speed of the impeller and the speed of the turbine.

The instant invention contemplates a centrifugally actuated valve for control of the flow of fluid in the unit. The valve is carried by the turbine and its operation is dependent upon the speed of rotation of the turbine. When the transmission is operating at a fair rate of speed, the valve is open so that the fluid flows through its normal path of circulation into the transmission; but when the speed decreases to a predetermined degree, the valve returns to its alternate position so that the flow of the fluid is diverted through a controlled passage leading to the transmission, characterized in that the control restricts the passage to cause the pressure induced on the fluid by the pump to produce turning moments on the turbine in opposite direction from the hydraulic drag produced between the impeller and turbine by the speed of rotation of the impeller complementary to the R. P. M. of the motor of the vehicle, so as to balance the turning moments with the drag.

An object of the invention is to balance the hydraulic friction in a fluid coupling.

Another object of the invention is to provide a fluid coupling and means for control of fluid flow in the coupling so as to provide for free circulation of the fluid at fair rates of speed and to so govern the flow of the fluid at low rates of speed as to produce turning moments on the driven member of the transmission in opposite direction to the hydraulic resistance between the driving and driven members of the transmission.

Another object of the invention is to provide a fluid coupling transmission for a motor vehicle including means for eliminating creep of the vehicle after coming to a stop.

Other objects and advantages of the invention will appear from the following description taken in connection with the drawings forming a part of this specication, and in which—

Figure 1:
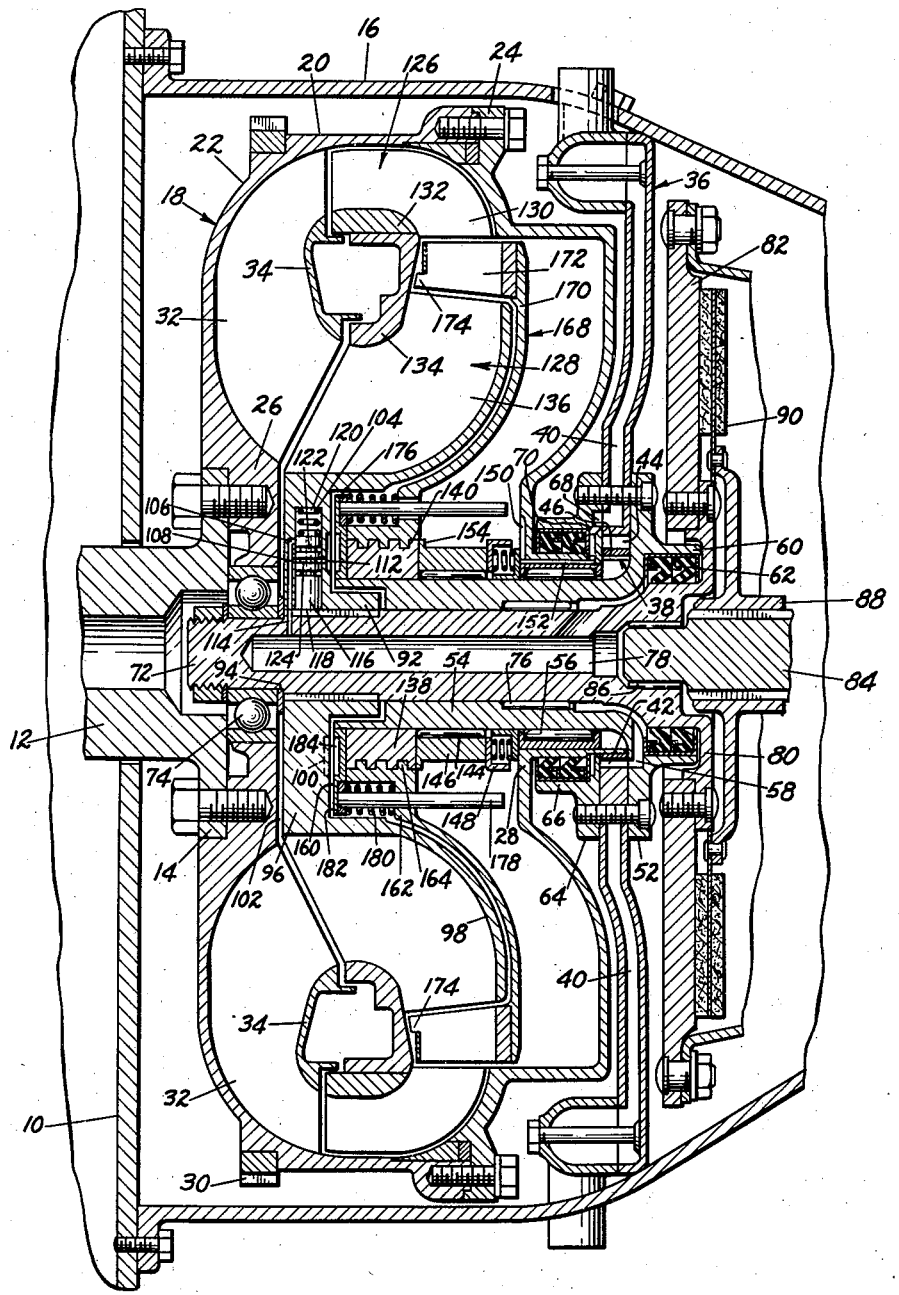
Fig. 1 is a sectional view of a torque converter embodying the invention.
Figure 2:
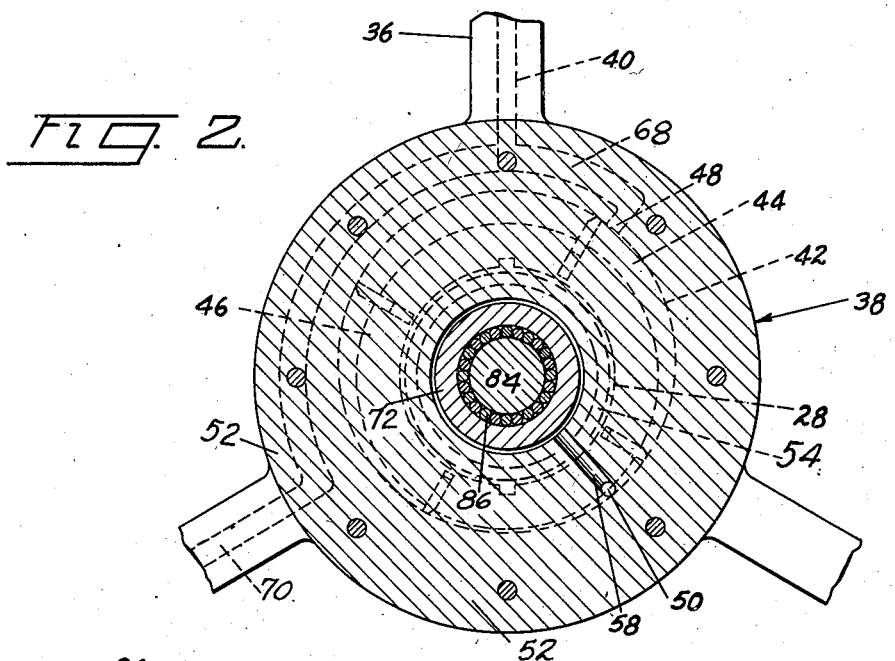
Fig. 2 is a sectional view of the pump.
Figure 3:
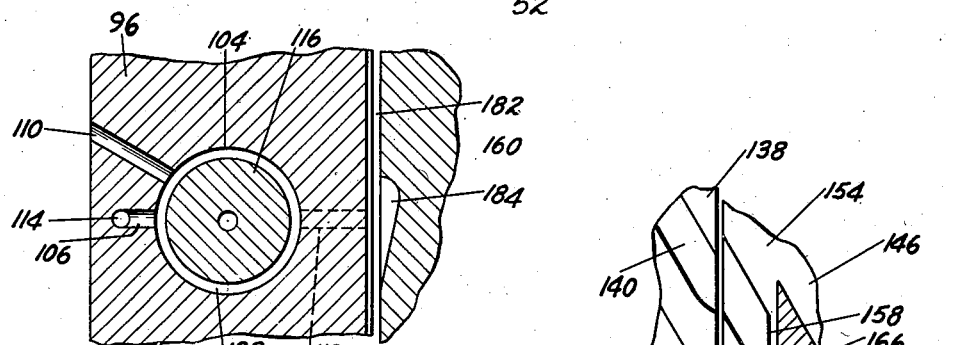
Fig. 3 is an enlarged detail view of the centrifugally actuated valve.
Figure 5:
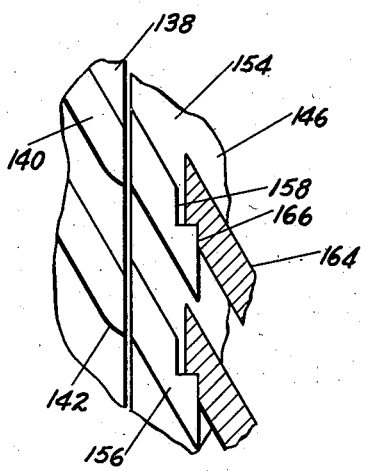
Fig. 5 is an enlarged fragmentary view of the screw for the reaction member.
Figure 4:
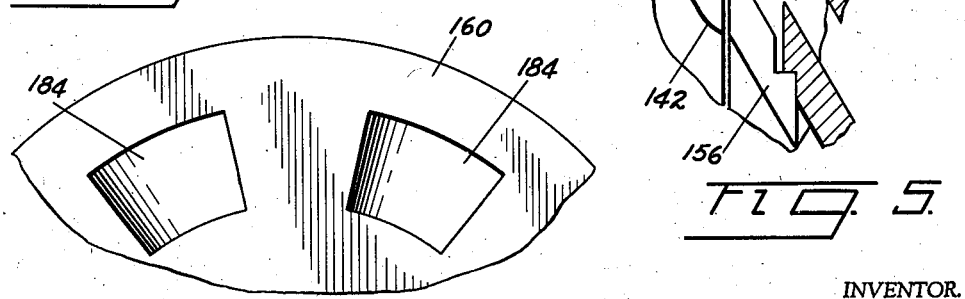
Fig. 4 is a fragmentary view of a control element.

Referring to the drawings for more specific details of the invention, 10 represents the crank case of an internal combustion engine, and 12 the crank shaft of the engine having a flange 14. The crank case 10 has secured thereto a bell housing 16 enclosing a torque converter indicated generally at 18. As shown, the torque converter includes a housing 20 having two parts 22 and 24 bolted or otherwise secured together. The part 22 has a hub 26 suitably secured to the flange 14 of the crank shaft 12, and the part 24 has a hub 28 in axial alignment with the hub 26. A ring gear 30 is suitably secured on the part 22 for attachment of a starter, not shown, and suitably secured on the inner wall of the part 22 is a plurality of impeller blades 32 supporting a shroud 34.

A bracket or spider 36 suitably secured to the wall of the bell housing 16 supports a pump 38. As shown, the spider has a passage 40 therethrough providing a communication between the pump and a suitable source of fluid supply. The spider also has an opening 42 therethrough disposed eccentrically with relation to the hub 28 on the housing. The wall defining the opening 42 provides a chamber 44 for the pump, and a rotor 46 is splined on the hub 28 within the chamber. The pump also has an inlet port 48, and a discharge port 50. Any preferred type of pump may be employed.

A ring 52 mounted on one side of the spider has thereon a sleeve 54 extended eccentrically through the chamber 44, concentrically through the rotor 46 and also through a bearing 56 in the hub 28 and into the housing 20 in axial alignment with the shaft 12, and a passage 58 through the ring 52 communicates with the discharge port 50. The ring 52 has thereon a concentrically disposed flange 60 supporting a fluid seal 62. A ring 64 mounted on the other side of the spider provides a cover plate for the chamber 44, and this ring has a concentrically disposed flange 66 supporting a fluid seal on the hub 28, and a passage 68 through the ring connects a passage 70 to the inlet port 48 of the pump.

A center shaft 72, supported for rotation in the sleeve 54 on a bearing 74 in the hub 26 of the housing and on a needle bearing 76 in the sleeve, has a passage 78 therethrough communicating with the passage 58 leading to the discharge port 50 of the pump. The center shaft also has a flange 80, and secured to this flange is a clutch member 82.

A driven shaft 84 journaled in a bushing 86 in the flange 80 of the center shaft in axial alignment with the center shaft has splined thereon a collar 88 carrying a clutch member 90 for cooperation with the clutch member 82. It is, of course, to be understood that the clutch members 82 and 90 constitute component parts of a conventional clutch operative in the usual manner.

A collar splined on the center shaft 72 is held against displacement by a washer 94 interposed between the collar and the bearing 74 of the center shaft. The collar has a heavy circumferential flange 96 spaced from the hub 26 by the washer 94. The flange supports a web 98 and has spaced pockets 100 in its body. The spacing of the flange 96 from the hub 26 provides an annular passage 102 communicating with the housing 20. The flange 96 has therein a radially disposed chamber 104, provided with spaced ports 106, 108, 110 and 112. The ports 106 and 108 are connected by a passage 114 to the passage 78 through the center shaft, the port 110 provides a communication between the passage 102 opening into the housing chamber and the passage 114, and the port 112 communicates with the spaced pockets 100 in the flange 96.

A reciprocable piston 116 in the chamber 104 is normally held on its seat 118 by a spring 120 interposed between the piston and the head of the chamber. This piston has circumferential grooves 122 and 124 adapted to alternately connect the ports 106 and 110 and the ports 108 and 112.

The web 98 supports a two-stage turbine 126 and 128. The first stage 126 of the turbine includes a plurality of vanes 130 supported on an inner shroud section 132 slidably engaging the shroud section 34 and fixedly connected to another shroud section 134 also slidably engaging the shroud section 34; and the second stage 128 of the turbine includes a plurality of vanes 136 secured to the web 98 and to the inner shroud section 134.

A stout sleeve 138 fitted on the sleeve 54 has external threads 140 provided with rounded approaches 142. This sleeve is in abutting relation to a pin bearing 144, also fitted on the sleeve 54 for support of a rotatable sleeve 146, frictionally held against rotation by an expansible member or a parallel brake 148 interposed between the sleeve 146 and the sleeve 54, and the housing 20 has passages 150 therein communicating with passages 152 through the bearing 56 in the hub 28 for the return of fluid from the housing 20 to the source of supply. The sleeve 146 has a flange 154 provided with threads 156 corresponding in pitch to the pitch of the threads 140 on the sleeve 138, and the threads 156 are notched to provide dogs 158. A ring 160 is fitted on the sleeve 54 in abutting relation to the stout sleeve 138. The ring 160 and the sleeve 138 are fixedly secured to one another and to the sleeve 54.

A carrier 162 mounted for travel on the sleeves 138 and 146 has threads 164 for cooperation with the threads 140 on the stout sleeve 138 and the threads 156 in the flange 154 on the sleeve 146, and arranged on the threads 164 of the carrier are dogs 166 for cooperation with the dogs 158 in the flange 154.

The carrier 162 supports a retractile reaction member 168 including a web 170 having arranged thereon a plurality of vanes 172, each provided with a tab 174. The vanes on the reaction member or web are adapted to move into and out of the fluid circuit in the housing 20 between the first and second stages of the turbine to increase or decrease the torque. To effectively control this movement of the reaction member, a ring 176 seated on the ring 160 has thereon a plurality of spaced rods 178 extended through openings in the web 170 of the reaction member, and sleeved on these rods between the web 170 and the ring 176 are springs 180 of graduated length operative to progressively increase resistance to movement of the reaction member to position the vanes thereon in the fluid flow. This feature provides the basis of a co-pending application entitled, Turbotransmissions, filed September 19, 1940, Serial No. 357,491, and is described in the instant application merely for the purpose of clarity as to the operation of the structure herein disclosed.

The ring 160 is spaced from the heavy flange 96 so as to provide an annular channel 182 constituting a communication between the chamber 104 and the housing 20, and the face of the ring 160 adjacent the flange 96 has spaced pockets 184 adapted to successively register with the pockets 100 communicating with the chamber 104 by port 112, which controls the flow of fluid through the port 112 so as to balance the pressure created by the pump with the hydraulic drag produced on the turbomembers induced by the power plant.

In a normal operation, assuming that the unit is filled with fluid to its normal capacity, transmission of force from the power plant through the crank shaft 12 results in driving the impeller. The impeller energizes the fluid in the fluid circuit, and the energy of the fluid is received on the vanes constituting the first stage 126 of the turbine and on the reaction vanes 172 of the reaction member 168, causing rotation of the turbine.

This rotation of the turbine results in driving the center shaft 72 and the driven shaft 84 clutched thereto. Upon rotation of the impeller the pump 38 is driven, and fluid is delivered by the pump through the bore of the center shaft into the fluid circuit.

As the speed of rotation of the impeller increases, the energy of the fluid increases proportionately, and this increased energy of the fluid acting on the vanes of the turbine causes increase in speed of the turbine. As this increased speed approaches that of the impeller, the angle of the fluid leaving the first stage of the turbine shifts from impinging on the faces of the reaction vanes 172 to impinge upon the backs of the reaction vanes, causing the reaction member 168 to spiral on the threaded sleeve 138 out of the fluid circuit onto the sleeve 146, and as the reaction member retracts, the index tabs 174 on the reaction vanes are moved to a position just within the circuit, and under this condition the unit functions as a fluid coupling.

During this stage of the operation, the piston 116 is held under the influence of centrifugal force against the resistance of the spring 120 so that the ports 106 and 110 register with the groove 122 in the piston. The pump 38 delivers fluid through the passage 78 in the center shaft, the passage 114 and port 106 into the groove 122 in the piston, thence through port 110 and passage 102 into the fluid circuit, and continues to do so while the turbine is rotating at a predetermined speed.

When the speed of the turbine decreases, the piston 116 is urged by the spring 120 to register the ports 108 and 112 with the groove 124 in the piston, and the fluid delivered by the pump passes through the port 112 into the interconnected pockets 108 adapted to register intermittently with the pockets 184, and this serves to restrict the flow of fluid and effectively resist movement of the turbine.

Upon decrease in the speed of rotation of the turbine, as when an increased load is imposed thereon, the angle of discharge from the first stage of the turbine shifts because of demand of torque ratio to impinge on the tabs 174, causing the reaction member to spiral into the fluid circuit. Upon initial movement of the reaction member tending to spiral into the circuit, the threads 164 on the carrier of the reaction member disengage the dogs 166 and engage the threads 156 on the sleeve 146 and advance thereon to the approaches 142 on the threads 140. The approaches 142 serve to guide the threads 164 into engagement with the threads 140, and as the carrier advances on the threads 140 the reaction member spirals into the fluid circuit against the progressively increasing resistance imposed by the springs 180.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A fluid transmission comprising a primary means for energizing fluid and a secondary means receiving energy from the fluid providing in conjunction with one another a fluid power transmission circuit, means for delivery of fluid into the circut, a spring-pressed slide valve carried by the secondary means and activated by centrifugal force for control of the flow of fluid from the delivery means operative at idling speed of the primary means to redirect the flow of fluid, and means for impeding the redirected flow so as to resist movement of the secondary means.

2. A fluid transmission comprising primary means for energizing fluid and secondary means for receiving energy from the fluid providing in conjunction with one another a fluid power transmitting circuit, a fixed support, a pump for delivering fluid into the circuit, a valve carried by the turbine and activated by centrifugal force for directing the delivery of fluid from the pump to the circuit, and cooperative means on the turbine and support to obstruct the flow of fluid between the valve and circuit so as to impede rotation of the secondary means.

3. A fluid transmission comprising an impeller, a turbine providing in conjunction therewith a fluid circuit, a reaction member movable into and out of the fluid circuit, means for delivery of fluid into the circuit, and means carried by the turbine controlling said delivery for delivering fluid into the circuit between the impeller and turbine at high speeds of rotation of the turbine and for delivering fluid into the circuit between the turbine and reaction member at low speeds of rotation of the turbine.

RAYMOND J. MILLER.